A. D. STEWART.
MACHINE FOR SAWING BARREL HEADS.

No. 20,962. Patented July 20, 1858.

UNITED STATES PATENT OFFICE.

A. D. STEWART, OF BENNINGTON, VERMONT.

MACHINE FOR CUTTING BOTH BEVELS SIMULTANEOUSLY ON BARREL-HEADS.

Specification of Letters Patent No. 20,962, dated July 20, 1858.

*To all whom it may concern:*

Be it known that I, A. D. STEWART, of Bennington, in the county of Bennington and State of Vermont, have invented a new and Improved Machine for Sawing Cask-Heads; and I do hereby declare that the following is a full, clear, and exact description of the same, reference being had to the annexed drawings, making a part of this specification, in which—

Figure 1:
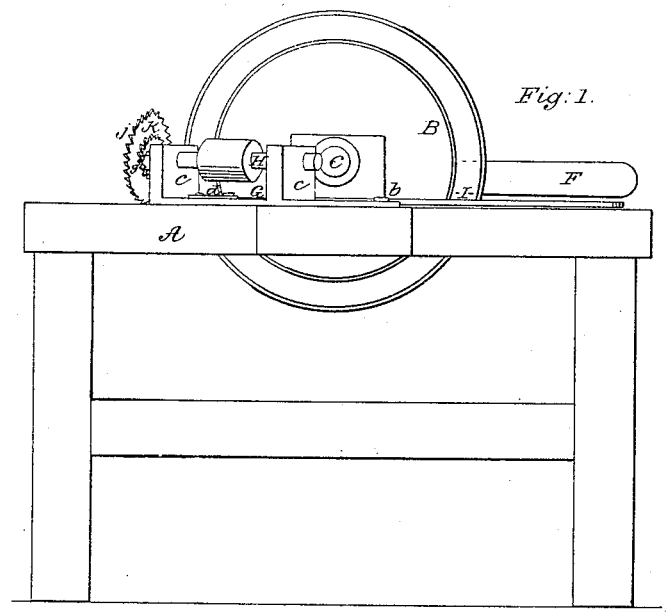
Figure 3:
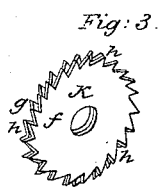
Figure 2:
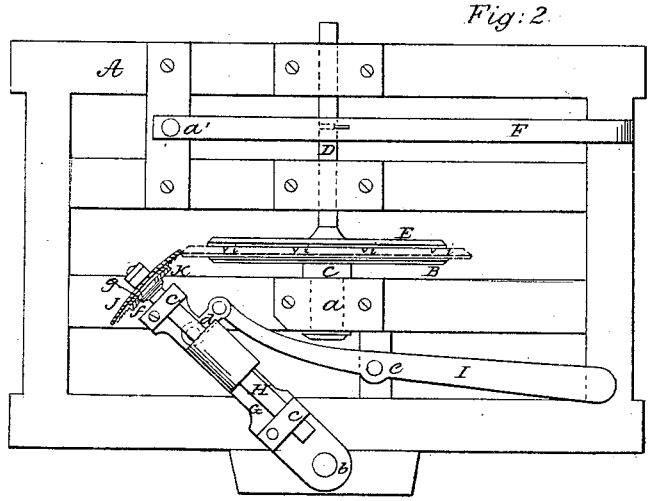

Figure 1, is a side view of my invention. Fig. 2, is a plan or top view of do. Fig. 3, is a detached perspective view of the smaller saw cutter.

Similar letters of reference indicate corresponding parts in the several figures.

This invention relates to an improvement in that class of machines for cutting cask heads in which circular concave saws are used.

The invention consists in using in connection with a circular concave saw and on the same mandrel a cutter formed of two or more saws arranged in a novel way as hereinafter shown and described, whereby the heads are cut out from the stuff, and a bevel cut on both sides of the heads at one and the same operation, the work being performed in a perfect and expeditious manner.

To enable those skilled in the art to fully understand and construct my invention I will proceed to describe it.

A, represents a rectangular frame in the upper part of which a circular disk B, is placed, said disk being attached to a horizontal shaft or axis C, which is fitted in a proper bearing *a*. D, is a horizontal shaft which is also placed on the upper part of the frame A, and in line with the shaft or axis C. The shaft D, has a circular disk E, attached to its inner end, and said shaft is allowed to slide longitudinally in its bearings, and may be thus actuated when necessary by a lever F, one end of which is pivoted to the frame A, at *a'*.

G, represents a plate or bed, the outer end of which is pivoted to the frame A, as shown at *b*. The plate or bed is allowed to turn freely on the pivot *b*, and two upright plates *c, c*, are attached to the plate or bed and a mandrel H, is fitted therein. To the plate or bed G, a lever I, is attached by a link *d*, said lever being attached to the frame A, by a fulcrum pin *e*, see Fig. 2.

To the inner end of the mandrel H, a circular concave saw J, is attached, and on the mandrel and adjoining the inner or concave side of the saw J, a cutter K, is placed.

The cutter K, is formed of two or more saws *f, g*, of equal diameter and smaller than the saw J. The saws *f, g*, are so placed on the mandrel H, that the teeth of one will be in line with the spaces between the teeth of the other, see more particularly Fig. 3, in which the cutter K, is clearly represented as being formed of two saws. In case three or more saws are used, the same relative position is observed, viz, the teeth of each saw being in line with the spaces between the teeth of the adjoining ones. At distances however of about seven teeth, the teeth of the wheels are made to coincide as shown at *h*, Fig. 3. These teeth *h*, may be termed finishers and they each form a smooth cutting edge the whole width of the cutter.

The operation is as follows: The "stuff" from which a head is to be cut is clamped between the disks B, E, the latter disk being provided with spurs *i*, and adjusted by means of the lever F. A rotary motion is given the mandrel H, by any proper means and the saw J, and cutter K, are moved toward the stuff, by actuating the lever I, the stuff being rotated by the operator who gradually turns the disks B, E, by hand. The concave saw J, cuts through the stuff and forms the bevel *j*, at one side of the head, and the cutter K, acts on the opposite side of the head forming the other bevel *k*,— the latter bevel *k*, is not as wide as the former one *j*. The cutter K, performs the most difficult part of the work, as it acts upon the head after the saw J, and the head is liable to be cut unevenly or be chipped out forming a rough or jagged edge. By having the cutter K, constructed as shown it is provided with fine teeth which take out very small chips, while the teeth *h*, smooth the work, said cutter thereby performing its work in a perfect manner.

I do not claim, broadly, the use of a concave cutter; nor do I claim, broadly, the employment of more than one saw or cutter upon an arbor; but

What I claim as my invention, and desire to secure by Letters Patent, is:

The arrangement and combination of saws (*f, g*) saw J, and mandrel H, as herein shown and described, whereby both bevels are simultaneously cut.

ASA D. STEWART.

Witnesses:
G. B. SIBLEY,
F. B. FENTON.